Sept. 13, 1966  G. E. APPLE  3,272,462
TREE HOLDING DEVICE
Filed Sept. 24 1964  3 Sheets-Sheet 1

INVENTOR.
GAROLD E. APPLE
BY M. A. Hobbs
ATTORNEY

Sept. 13, 1966  G. E. APPLE  3,272,462
TREE HOLDING DEVICE
Filed Sept. 24, 1964  3 Sheets-Sheet 2

INVENTOR.
GAROLD E. APPLE
BY M. A. Hobbs
ATTORNEY

Sept. 13, 1966   G. E. APPLE   3,272,462
TREE HOLDING DEVICE
Filed Sept. 24, 1964   3 Sheets-Sheet 3

INVENTOR.
GAROLD E. APPLE
BY *m. a. Hobbs*
ATTORNEY

3,272,462
TREE HOLDING DEVICE
Garold E. Apple, R.R. 4, Plymouth, Ind.
Filed Sept. 24, 1964, Ser. No. 399,112
3 Claims. (Cl. 248—44)

The present invention relates to a tree holding device and more particularly to a Christmas tree display device and stand.

Christmas trees on sales are usually displayed without a stand or other holding device, the trees being merely laid on their sides or leaned against a wall or one another. Aside from the fact that this often results in the trees becoming misshapen and frequently damaged by the breaking of the boughs, the natural shapes and sizes of the trees are often difficult to discern. Further, the lower ends of the trunks of the trees are often cut in an irregular shape which increases the difficulty of displaying the trees and mounting the trees on a stand after they have been sold, it often being necessary for the purchaser to square the bottom of the trunk before the stand can be attached. It is therefore one of the principal objects of the present invention to provide a Christmas tree display device and stand which can be used to hold the trees in an erect position for display purposes on a rack or other rigid support, and which can be used without substantial change as a stand in the home.

Another object of the invention is to provide a device which can be permanently attached to the base of a Christmas tree and which can be readily mounted on various types of supports and stands and mounted with a container for water around the bottom of the tree.

Still another object of the present invention is to provide a Christmas tree stand having a shaft threaded on one end for threading into a hole in the bottom of the trunk of the tree and threaded on the other end for assembling the shaft on a stand by the use of a single, easily applied nut.

A further object is to provide a Christmas tree display device and stand of the aforesaid type having parts which can be preassembled on the base of the tree, and thereafter firmly mounted on the remainder of the stand with the lower end of the tree trunk seated in a container for water.

Another object of the invention is to provide a relatively simple, easily fabricated tree display device and stand which can be easily and readily assembled and disassembled and conveniently stored, and which can be used effectively either as a display device or a stand without changing the structure thereof.

Additional objects and advantages of the present invention will become apparent from the following description and accompanying drawings, wherein.

Figure 1:
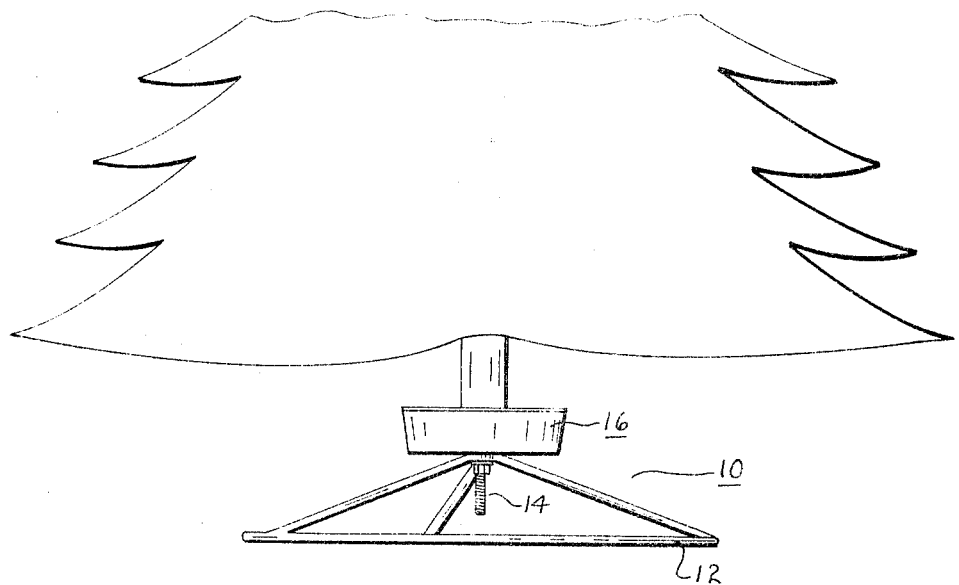
FIGURE 1 is an elevational view of the present Christmas tree display device and stand, showing the lower portion of a tree mounted thereon.
Figure 2:
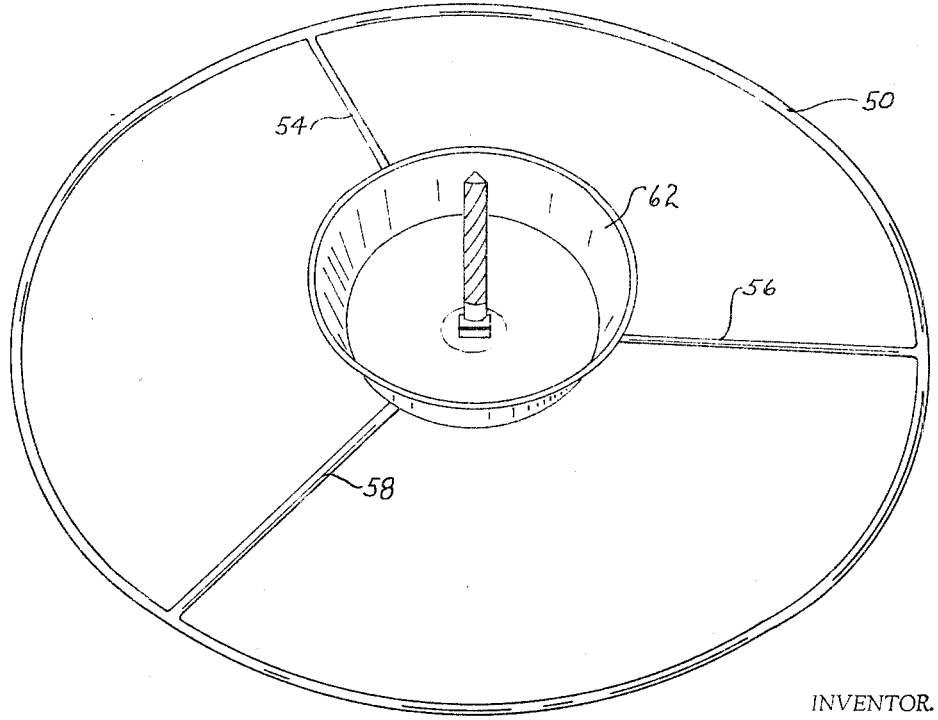
FIGURE 2 is a perspective view of the Christmas tree display device and stand, showing the form when the device is used as a stand.
Figure 3:
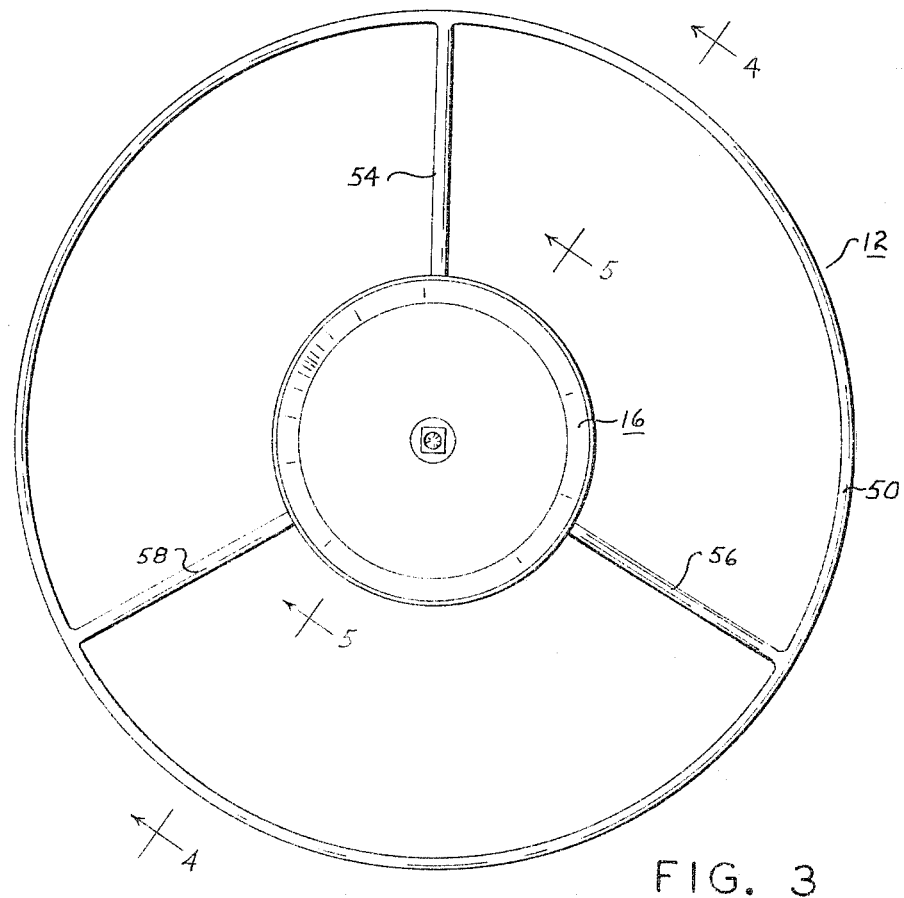
FIGURE 3 is a top plan view of the combination display device and stand.
Figure 4:
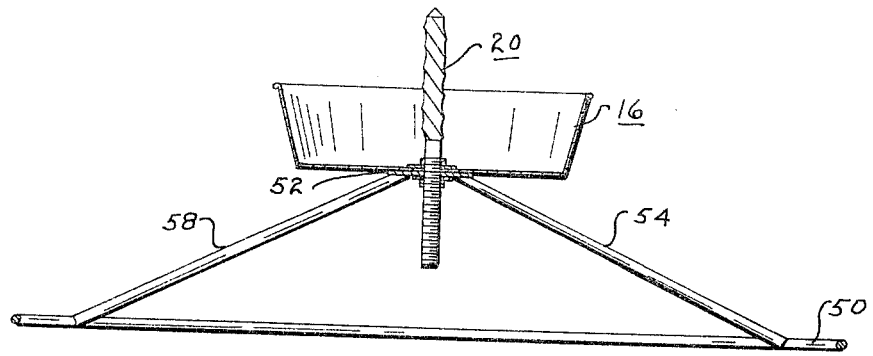
FIGURE 4 is a vertical cross sectional view of the display device and stand, the section being taken on line 4—4 of FIGURE 3.
Figure 6:
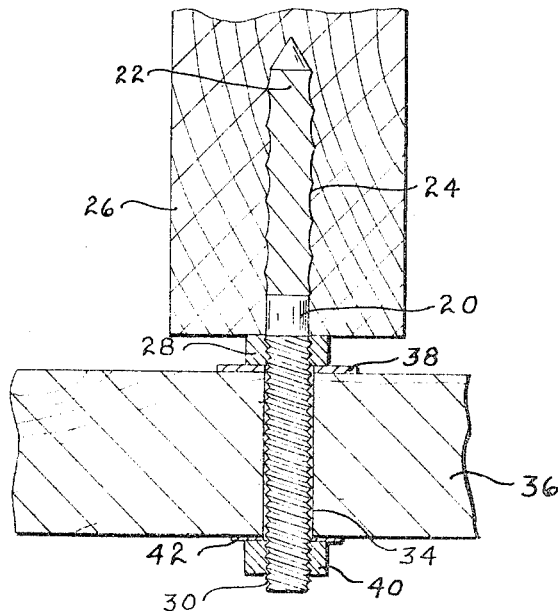
FIGURE 6 is an enlarged cross sectional view similar to that shown in FIGURE 5, illustrating the manner in which the device may be used for displaying a tree.
Figure 5:
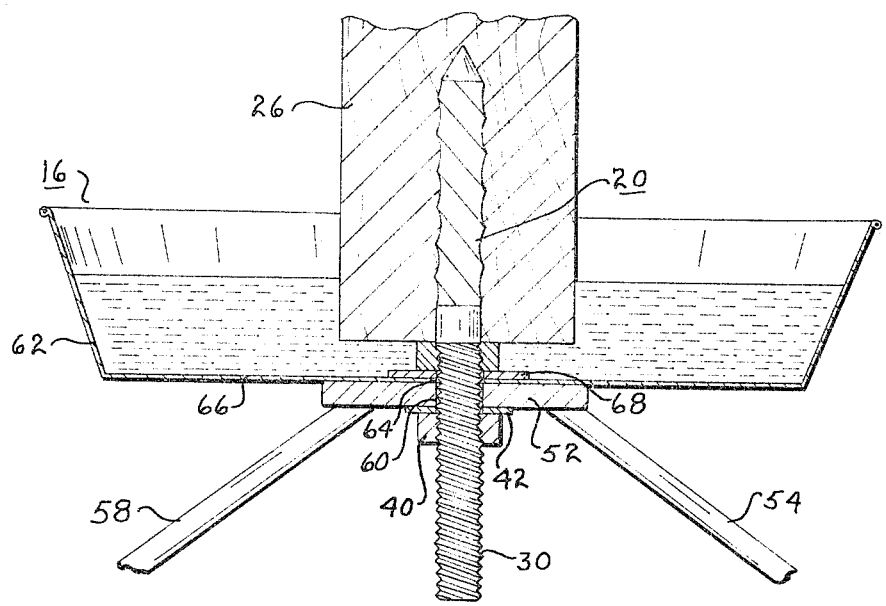
FIGURE 5 is an enlarged cross sectional view of the display device and stand, showing the lower portion of a tree trunk mounted thereon, the section being taken on line 5—5 of FIGURE 3.

Referring more specifically to the drawings, and to FIGURE 1 in particular, numeral 10 designates generally the present Christmas tree display device and stand, numeral 12 a base of the stand, 14 a tree holder, and 16 a receptacle for water in which the lower portion of the tree trunk is seated. The present invention is primarily concerned with the combination of a Christmas tree display device and stand which holds the tree in an erect position for displaying, and which can be easily transported with the tree from the market place to the home, and assembled in a stand using similar parts in the display holder and home stand. While it is designed primarily for use in holding Christmas trees of the size normally used in the average home, it may be made sufficiently large to effectively hold trees the size normally used in assembly halls, hotel lobbies and even in parks and other outdoor displays.

The Christmas tree holder consists of a shaft 20, having an upper threaded portion 22 of a coarse thread for threading into a hole 24 in the bottom of the tree trunk, designated on the drawings by numerals 26. A radial flange 28 is provided on the shaft near the center thereof for forming a surface against which the bottom of the tree can seat firmly. The lower end of the shaft is provided with threads 30 of substantially less pitch than the threaded portion 24, and adapted to receive flange 28 which is a nut in this embodiment, as illustrated in the drawings. The holder, consisting of the shaft threaded at both ends and the lower end 30, is inserted in a hole 34, for example, in a display support rack 36, or in a hole in the base portion of the stand, as will be more fully described hereinafter.

When the shaft is placed in hole 34, a washer 38 is slipped onto the lower end of the shaft and the shaft placed in the hole and held therein by a nut 40 threaded onto the lower end of the shaft and seating against washer 42. The tree and holder thereafter may be handled as a unit, and when the tree is sold, the nut 40 is removed from the shaft and the shaft is lifted from hole 34 along with the tree. However, the tree may be removed from the display holder and assembled on an identical stand holder.

The holder is used in combination with base 12, which consists of a large ring 50 and an inner plate 52 connected to and support on ring 50 by three radial arms 54, 56 and 58, integrally joined to the under side of plate 52 and to the inner side of ring 50, preferably by welding. Plate 52 contains a center hole 60 for receiving the lower end 30 of shaft 20, the shaft being held in hole 60 by nut 40, which is threaded onto the lower end of the shaft and seated firmly against washer 42, engaging the under side of plate 52.

In order to provide water for the tree, a receptacle 62, consisting of a relatively low, flat, pan-shaped container and containing a center opening 64 in bottom 66, is seated on the upper surface of plate 52, and plate 52 is held in fluid-tight relationship with the inner surface of bottom 66 by washer-like gasket 68, held firmly against the bottom by the tightening of nut 40 firmly against the underside of plate 52.

It is thus seen that the present tree display device and stand would permit the seller to insert shaft 20 in the bottom of the tree trunk and thereafter to display the tree in an erect, firmly held position on a rack or other suitable support, and thereafter permit the buyer to easily assemble the tree on the stand when the tree is placed in the home. The only assembling required by the purchaser of the tree is the placing of washer 42 and nut 40 on the lower end of shaft 30 and tightening the nut firmly against the underside of plate 52.

After the shaft has been assembled on the base, with the shaft extending through bottom 66 of receptacle 62 and through plate 52, the shaft is secured in place in fluid-tight relationship with the container. Water is then placed in the receptacle in an amount sufficient to cover the bottom of the tree. If desired, the container may be omitted and the shaft, with the tree mounted thereon, secured directly to plate 52 with washer 68 or flange 28 seating directly on the upper surface of the plate.

Occasionally, some difficulty is encountered in assembling the holder in the hole in the tree. This difficulty may be eliminated by using a shaft 20 with threads on the upper end only near the bottom, i.e., adjacent nut or flange 28 with the shaft thereabove being slightly smaller in diameter than the threaded portion.

While only one embodiment of the present invention has been described in detail herein, various changes and modifications may be made without departing from the scope of the invention.

I claim:

1. A Christmas tree display device and stand, comprising a base having a relatively large ring member, a disc-shaped plate at the center of said ring member positioned on an elevated plane and having a vertically positioned hole therein, equally spaced arms connecting said plate and ring member to form a rigid structure therewith, a water receptacle seated on said plate and having a flat bottom with a center hole therethrough in alignment with the hole in said plate, the central area of said bottom around the hole therein being supported and reinforced by said plate, a vertically positioned shaft removably secured to said plate in said hole and having each end threaded, the threads on the upper end having a greater pitch than the threads on the lower end, a washer-like gasket on said shaft above said plate, a nut threaded onto the threads of the lower end of said shaft to a point near the middle thereof and being seated on said gasket, a washer on said shaft below said plate, and a nut on said shaft engaging said washer for securing said shaft to said plate and for clamping said plate and receptacle together and securing said shaft in said holes in an upright position and in a water-tight relationship with said receptacle.

2. A Christmas tree display device and stand, comprising a base having a relatively large ring member, a disc-shaped plate at the center of said ring member positioned on an elevated plane and having a vertically positioned hole therein, equally spaced arms connecting said plate and said ring member to form a rigid structure therewith, a water receptacle seated on said plate and having a flat bottom with a hole therethrough in alignment with the hole in said plate, the central area of said bottom around the hole therein being supported and reinforced by said plate, a vertically positioned shaft removably secured to said plate in said hole and having each end threaded, the threads on the upper end having a greater pitch than the threads on the lower end, a washer on said shaft above said plate, a nut disposed on said shaft near the middle thereof and seated on said washer, a washer on said shaft below said plate, and a nut on said shaft engaging said last mentioned washer for securing said shaft to said plate and for holding said shaft in an upright position and said plate in supporting relationship to the central area of said bottom around the hole therein.

3. A Christmas tree display device and stand, comprising a base having a plate with a vertically positioned hole therein, a plurality of equally spaced arms connecting said plate and said ring member to form a rigid structure therewith, a water receptacle seated on said plate and having a flat bottom with a hole therethrough in alignment with the hole in said plate, the central area of said bottom around the hole therein being supported and reinforced by said plate, a vertically positioned shaft removably secured to said plate in said hole and having threaded portions on each end, the threads on the upper end having a greater pitch than the threads on the lower end, a washer-like gasket on said shaft above said plate, a collar means mounted rigidly on said shaft at a point near the middle thereof and being seated on said gasket, a washer on said shaft below said plate, and a nut on said shaft engaging said washer for securing said shaft in said holes and for holding said shaft in an upright position and said plate in supporting relationship to the central area of said bottom around the hole therein.

References Cited by the Examiner

UNITED STATES PATENTS

| 2,746,700 | 5/1956 | Barbera | 248—44 |
| 2,893,668 | 7/1959 | Applegate | 248—44 |
| 2,908,461 | 10/1959 | Coffeen | 248—44 |

CLAUDE A. LE ROY, *Primary Examiner.*

J. F. FOSS, *Assistant Examiner.*